US010129273B2

(12) United States Patent
Palazzo et al.

(10) Patent No.: US 10,129,273 B2
(45) Date of Patent: Nov. 13, 2018

(54) SYSTEM AND METHODS FOR COMPUTER NETWORK SECURITY INVOLVING USER CONFIRMATION OF NETWORK CONNECTIONS

(71) Applicant: Cisco Technology, Inc., San Jose, CA (US)

(72) Inventors: Robert Charles Palazzo, Marietta, GA (US); Michael Sea Luu, Novato, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 15/054,574

(22) Filed: Feb. 26, 2016

(65) Prior Publication Data

US 2016/0255105 A1    Sep. 1, 2016

Related U.S. Application Data

(60) Provisional application No. 62/126,075, filed on Feb. 27, 2015.

(51) Int. Cl.
*G06F 3/00* (2006.01)
*H04L 29/06* (2006.01)

(52) U.S. Cl.
CPC ...... *H04L 63/1416* (2013.01); *H04L 63/0227* (2013.01); *H04L 63/1425* (2013.01)

(58) Field of Classification Search
CPC ............. H04L 63/0227; H04L 63/1416; H04L 63/1425
See application file for complete search history.

(56) References Cited

U.S. PATENT DOCUMENTS

| 5,375,244 | A | 12/1994 | McNair |
| 5,557,686 | A | 9/1996 | Brown et al. |
| 5,557,742 | A | 9/1996 | Smaha et al. |
| 5,621,889 | A | 4/1997 | Lermuzeaux et al. |
| 5,796,942 | A | 8/1998 | Esbensen |
| 5,825,750 | A | 10/1998 | Thompson |

(Continued)

FOREIGN PATENT DOCUMENTS

| EP | 0909074 A1 | 4/1999 |
| EP | 1887754 A1 | 2/2008 |

(Continued)

OTHER PUBLICATIONS

Barford, Paul, et al., Characteristics of Network Traffic Flow Anomalies, ACM SIGCOMM Internet Measurement Workshop 2001 (http://www.cs.wisc.edu/pb/ublications.html), Jul. 2001.

(Continued)

*Primary Examiner* — Joseph P Hirl
*Assistant Examiner* — Sayed Aresh Beheshti Shirazi

(57) ABSTRACT

Systems and methods for detecting anomalies in network traffic and providing notification to the users of the computers that generated the network traffic for confirmation of the activities that resulted in the network traffic are described herein. According to particular embodiments, the system is configured to collect data regarding network activity (e.g., via sensors), generate inquiries to users regarding that activity, receive the user's response to those inquiries, and provide the user's response along with the network activity to a security analyst.

27 Claims, 11 Drawing Sheets

Exemplary Security Event Scenarios

(56) References Cited

U.S. PATENT DOCUMENTS

| | | | |
|---|---|---|---|
| 5,970,227 | A | 10/1999 | Dayan et al. |
| 5,991,881 | A * | 11/1999 | Conklin .................. H04L 41/00 |
| | | | 709/224 |
| 6,119,236 | A | 9/2000 | Shipley |
| 6,182,226 | B1 | 1/2001 | Reid et al. |
| 6,275,942 | B1 | 8/2001 | Bernhard et al. |
| 6,321,338 | B1 | 11/2001 | Porras et al. |
| 6,363,489 | B1 | 3/2002 | Comay et al. |
| 6,453,345 | B2 | 9/2002 | Trcka et al. |
| 6,502,131 | B1 | 12/2002 | Vaid et al. |
| 6,628,654 | B1 | 9/2003 | Albert et al. |
| 6,853,619 | B1 | 2/2005 | Grenot |
| 6,891,839 | B2 | 5/2005 | Albert et al. |
| 6,894,972 | B1 | 5/2005 | Phaal |
| 7,017,186 | B2 | 3/2006 | Day |
| 7,164,657 | B2 | 1/2007 | Phaal |
| 7,908,645 | B2 | 3/2011 | Varghese et al. |
| 7,934,253 | B2 | 4/2011 | Overcash et al. |
| 8,468,582 | B2 * | 6/2013 | Kuang ..................... H04L 63/08 |
| | | | 380/277 |
| 8,595,262 | B1 * | 11/2013 | Hayden ............. G06F 17/30545 |
| | | | 370/252 |
| 8,745,191 | B2 * | 6/2014 | Raleigh ................ G06Q 30/016 |
| | | | 455/414.1 |
| 9,055,090 | B2 * | 6/2015 | Delatorre ............ H04L 63/1441 |
| 9,077,747 | B1 * | 7/2015 | Chen ................... H04L 63/1441 |
| 9,235,704 | B2 | 1/2016 | Wootton et al. |
| 2002/0103903 | A1 | 8/2002 | Bruton et al. |
| 2002/0104017 | A1 | 8/2002 | Stefan |
| 2002/0133586 | A1 * | 9/2002 | Shanklin ................. H04L 43/00 |
| | | | 709/224 |
| 2003/0051026 | A1 | 3/2003 | Carter et al. |
| 2004/0049698 | A1 | 3/2004 | Ott et al. |
| 2004/0073443 | A1 * | 4/2004 | Gabrick ............ G06F 17/30011 |
| | | | 705/310 |
| 2004/0187032 | A1 | 9/2004 | Gels et al. |
| 2004/0237098 | A1 | 11/2004 | Watson et al. |
| 2006/0026669 | A1 * | 2/2006 | Zakas ..................... H04L 29/06 |
| | | | 726/6 |
| 2006/0123482 | A1 | 6/2006 | Aaron |
| 2006/0195588 | A1 | 8/2006 | Pennington et al. |
| 2008/0091681 | A1 | 4/2008 | Dwivedi et al. |
| 2011/0314148 | A1 * | 12/2011 | Petersen ............. G06F 11/3476 |
| | | | 709/224 |
| 2012/0214442 | A1 * | 8/2012 | Crawford ............. H04W 12/06 |
| | | | 455/411 |
| 2012/0222107 | A1 * | 8/2012 | Sainio ................... G06F 21/554 |
| | | | 726/12 |
| 2013/0179991 | A1 * | 7/2013 | White ..................... G06F 21/53 |
| | | | 726/29 |
| 2015/0186369 | A1 * | 7/2015 | Yan ................... G06F 17/30268 |
| | | | 715/201 |
| 2016/0189505 | A1 * | 6/2016 | Boettcher ............. G08B 13/22 |
| | | | 340/541 |

FOREIGN PATENT DOCUMENTS

| | | |
|---|---|---|
| WO | 97/29413 A2 | 8/1997 |
| WO | 00/34847 A1 | 6/2000 |
| WO | 01/31420 A3 | 5/2001 |

OTHER PUBLICATIONS

Cooper, Mark, An Overview of Intrusion Detection Systems, Xinetica White Paper, (www.xinetica.com), Nov. 19, 2001.

Copeland, John A. et al., IP Flow Identification for IP Traffic Carried Over Switched Networks, The International Journal of Computer and Telecommunications Networking Computer Networks 31 (1999), pp. 493-504.

Debar. et al., Towards a Taxonomy of Intrusion-Detection Systems, Computer Networks, Elsevier Science Publishers, B.V., Amsterdam, NL Apr. 23, 1999, pp. 805-822.

Frincke, Deborah, et al., A Framework for Cooperative Intrusion Detection, 21st National Information Systems Security conference, Oct. 1998, Crystal City, VA.

Gupta Sunil. "Logging and Monitoring to Detect Network Intrusions and Compliance Violations in the Environment." SANS Institute InfoSec Reading Room. SANS Institute, Jul. 4, 2012. Web. Feb. 3, 2016.

Javitz H Setal., The SRI IDES Statistical Anomaly Detector, Proceedings of the Symposium on Research in Security and Privacy US Los Alamitos, IEEE Camp. Soc. Press, v. Symp. 12, pp. 316-326 XP000220803ISBN: 0-8186-2168-0, p. 316, col. 1, line 1, p. 318, col. 1, line 3.

Kato, et al., A Real-Time Intrusion Detection System for Large Scale Networks and its Evaluations, Ieice Transactions on Communications, Institute of Electronics Information and Comm Enn Tokyo, Japan: Nov. 1999 pp. D 1817-1825.

LANSleuth Fact Sheet, LANSleuth LAN Analyzer for Ethernet and Token Ring Networks, (www.lansleuth.com/features.html) Aurora, Illinois.

LANSleuth General Features, (www.lansleuth.com/features.html) Aurora, Illinois.

Lunt T Fetal., Knowledge-based Intrusion Detection, Proceedings of the Annual Artificial Intelligence Systems in Government Conference US, Washington, IEEE Camp. Soc. Press, vol. Conf. 4, pp. 102-107 XP000040018 p. 102, col. 1, line 1, p. 105, col. 2, line 21.

Mahoney, M., Network Traffic Anomaly Detection Based on Packet Byles, ACM, 2003, Fl. Institute of Technology, entire document, http://sss.cs.fit.edu/-mmahoney/paper6.pdf.

Mukherjee, Biswanath, et al., Network Intrusion Detection, IEEE Network, May/Jun. 1994.

Networking-vs-Host-Based Intrusion Detection: A Guide to Intrusion Detection Technology ISS Internet Security Systems, Oct. 2, 1998, Atlanta, GA.

Newman, P., et al. RFC 1953: Ipsilon Flow Management Protocol Specification for 1Pv4 Version 1.0 (www.xyweb.com/rfc/rfc1953.html) May 19, 1999.

Paxson, Vern, Bro: A System for Detecting Network Intruders in Real-Time, 7th US EN IX Security Symposium, Lawrence Berkkeley National Laboratory, San Antonio, TX, Jan. 26-29, 1998.

Phaal, Panchen, and McKee, "InMon Corporation's sFiow: A Method for Monitoring Traffic in Switched and Routed Networks," Network Working Group, Request for Comments: 3176 (RFC-3176)(Sep. 2001 ). pp. 1-31.

Phrack Magazine, vol. 8, Issue 53, Jul. 8, 1998, Article 11 of 15.

Plan Quart, Jean-Philippe, Application of Neural Networks to Intrusion Detection, SANS Institute, Jul. 29, 2001, entire document.

Examination Report dated Feb. 27, 2015 for related European patent application No. 02723615.7.

International Search Report and Written Opinion in counterpart International Application No. PCT/US2016/019810, dated Jul. 7, 2016, 10 pages.

* cited by examiner

FIG. 1 Exemplary Security Event Scenarios

Exemplary Security System Architecture

Exemplary System Process and Data Items (User Query)

Exemplary System Process and Data Items (Alert E-mail)

Exemplary Process Flow

Raw Data

| Terminal ID | Time Stamp | Application ID | Data Packet Headers | | | |
|---|---|---|---|---|---|---|
| | | | Source IP Address | Destination IP Address | Source Port | Destination Port |
| 1 | 10:15:00 UTC | 12345 | 10.1.0.10 | 102.168.212.226 | P.1 | P.A |
| 1 | 12:15:00 UTC | 12345 | 10.1.0.10 | 102.168.212.226 | P.1 | P.A |
| 1 | 14:15:00 UTC | 12345 | 10.1.0.10 | 168.212.226.204 | P.1 | P.M |
| 1 | 16:00:00 UTC | 12345 | 10.1.0.10 | 200.168.212.226 | P.1 | P.N |

FIG. 5A Exemplary Raw Data Table

Alert Data

| Terminal ID | Time Stamp | Application ID | Source IP Address | Destination IP Address | Source Port | Destination Port | Alert ID | Alert Category |
|---|---|---|---|---|---|---|---|---|
| 1 | 14:15:00 UTC | 12345 | 10.1.0.10 | 168.212.226.204 | P.1 | P.M | ABCD | Low |
| 1 | 16:00:00 UTC | 12345 | 10.1.0.10 | 200.168.212.226 | P.1 | P.N | EFGH | High |

FIG. 5B Exemplary Alert Data Table

User ID Queries

| Source IP Address | Time Stamp | User ID | E-mail |
|---|---|---|---|
| 10.1.0.10 | 14:15:00 UTC | null | null |
| 10.1.0.10 | 16:00:00 UTC | null | null |

FIG. 5C Exemplary User ID Queries

User ID Response

| Source IP Address | Time Stamp | User ID | E-mail |
|---|---|---|---|
| 10.1.0.10 | 14:15:00 UTC | Bob | bob@acme.com |
| 10.1.0.10 | 16:00:00 UTC | Bob | bob@acme.com |

FIG. 5D Exemplary User ID Response

Alert Prompt

| Alert ID | Terminal ID | Time Stamp | Application ID | Source IP Address | Destination IP Address | User ID | E-mail |
|---|---|---|---|---|---|---|---|
| ABCD | 1 | 14:15:00 UTC | 12345 | 10.1.0.10 | 168.212.226.204 | Bob | bob@acme.com |
| EFGH | 1 | 16:00:00 UTC | 12345 | 10.1.0.10 | 200.168.212.226 | Bob | bob@acme.com |

FIG. 5E Exemplary Alert Prompt Table

Alert E-mail: Did you intentionally access Nefarious Server?

| Alert ID | Terminal ID | Time Stamp | Application ID | Source IP Address | Destination IP Address | User ID | E-mail | Yes/No |
|---|---|---|---|---|---|---|---|---|
| ABCD | 1 | 14:15:00 UTC | 12345 | 10.1.0.10 | 168.212.226.204 | Bob | bob@acme.com | null |
| EFGH | 1 | 16:00:00 UTC | 12345 | 10.1.0.10 | 200.168.212.226 | Bob | bob@acme.com | null |

FIG. 5F Exemplary Alert E-mail Table

User Query: Did you intentionally access Nefarious Server?

| Alert ID | Terminal ID | Time Stamp | Application ID | Source IP Address | Destination IP Address | Yes/No |
|---|---|---|---|---|---|---|
| ABCD | 1 | 14:15:00 UTC | 12345 | 10.1.0.10 | 168.212.226.204 | |
| EFGH | 1 | 16:00:00 UTC | 12345 | 10.1.0.10 | 200.168.212.226 | |

FIG. 5G Exemplary User Query Table

| User Input |
|---|
| Yes |
| No |

| Optional User Input |
|---|
| Future Expected Frequency |
| Tag(s) |
| Comment |

FIG. 5H Exemplary User Input

User Response: Alert E-mail

| Alert ID | Terminal ID | Time Stamp | Application ID | Destination IP Address | User ID | E-mail | Yes/No |
|---|---|---|---|---|---|---|---|
| ABCD | 1 | 14:15:00 UTC | 12345 | 168.212.226.204 | Bob | bob@acme.com | Yes |
| EFGH | 1 | 16:00:00 UTC | 12345 | 200.168.212.226 | Bob | bob@acme.com | No |

FIG. 5I Exemplary User Response Table (Alert E-mail)

User Response: User Query

| Alert ID | Terminal ID | Time Stamp | Application ID | Source IP Address | Destination IP Address | Yes/No |
|---|---|---|---|---|---|---|
| ABCD | 1 | 14:15:00 UTC | 12345 | 10.1.0.10 | 168.212.226.204 | Yes |
| EFGH | 1 | 16:00:00 UTC | 12345 | 10.1.0.10 | 200.168.212.226 | No |

FIG. 5J Exemplary User Response Table (User Query)

Alert Data & User Response

| Alert ID | Terminal ID | Data Packet | Time Stamp | Application ID | Source IP Address | Destination IP Address | Source Port | Destination Port | Alert Category | User Input |
|---|---|---|---|---|---|---|---|---|---|---|
| ABCD | 1 | M | 14:15:00 UTC | 12345 | 10.1.0.10 | 168.212.226.204 | P.1 | P.M | low | Yes |
| EFGH | 1 | M | 16:00:00 UTC | 12345 | 10.1.0.10 | 200.168.212.226 | P.1 | P.N | high | No |

FIG. 5K Exemplary Alert Data & User Response Table

Merged Alert Data & User Response

| Alert ID | Terminal ID | Time Stamp | Application ID | Source IP Address | Destination IP Address | Source Port | Destination Port | Alert Category | User Input | Index Points | Other Relevant Alerts |
|---|---|---|---|---|---|---|---|---|---|---|---|
| ABCD | 1 | 14:15:00 UTC | 12345 | 10.1.0.10 | 168.212.226.204 | P.1 | P.M | low | Yes | 0 | |
| EFGH | 1 | 16:00:00 UTC | 12345 | 10.1.0.10 | 200.168.212.226 | P.1 | P.N | high | No | 1 | ABCD |

FIG. 5L Exemplary Merged Alert Data & User Response Table

Security Policy

| Application ID | Destination IP Address | Permission | User(s) ID | Port(s) | Protocol(s) |
|---|---|---|---|---|---|
| 12345 | 168.212.226.204 | Yes | Bob | value | value |
| 12345 | 200.168.212.226 | No | Bob | null | null |

FIG. 5M Exemplary Security Policy Table

| User Engagement Policy ||||
|---|---|---|---|
| User ID | Alert Frequency | Alert Category | Engagement Type | Address |
| Bob | any time | all | Email | bob@acme.com |
| Joe | once per hour | > low | Text | 404.123.4567 |
| Bill | priority > 7 | high > index > low | Query | acme.com/session ID |

FIG. 5N User Engagement Policy Table

SYSTEM AND METHODS FOR COMPUTER NETWORK SECURITY INVOLVING USER CONFIRMATION OF NETWORK CONNECTIONS

BENEFIT CLAIM

This application claims the benefit under 35 U.S.C. 119(e) and priority to Provisional Application No. 62/126,075, filed Feb. 27, 2015, the entire contents of which are hereby incorporated by reference for all purposes as if fully set forth herein.

CROSS-REFERENCE TO RELATED APPLICATION(S)

This application is related to the following U.S. patents: U.S. patent application Ser. No. 10/000,396, filed Nov. 30, 2001, entitled "Flow-Based Detection of Network Intrusions", now U.S. Pat. No. 7,185,368; U.S. patent application Ser. No. 11/624,441, filed Jan. 18, 2007, entitled "Flow-Based Detection of Network Intrusions", now U.S. Pat. No. 7,475,426; U.S. patent application Ser. No. 10/908,809, filed May 26, 2005, entitled "Packet Sampling Flow-Based Detection of Network Intrusions", now U.S. Pat. No. 7,512,980; U.S. patent application Ser. No. 10/062,621, filed Jan. 31, 2002, entitled "Network Port Profiling", now U.S. Pat. No. 7,290,283; U.S. patent application Ser. No. 11/844,568, filed Aug. 24, 2007, entitled "Network Port Profiling", now U.S. Pat. No. 7,886,358; U.S. patent application Ser. No. 10/106,298, filed Mar. 25, 2002, entitled "Network Service Zone Locking", now U.S. Pat. No. 7,644,151; U.S. patent application Ser. No. 12/628,892, filed Dec. 1, 2009, entitled "Network Service Zone Locking", now U.S. Pat. No. 7,895,326; the entire contents of which are hereby incorporated by reference as if fully set forth herein (the "Incorporated References").

TECHNICAL FIELD

The present disclosure relates generally to network security and, more particularly, to anomaly and pattern recognition and notification in the field of network security involving user confirmation and/or feedback of questionable or suspected nefarious network connections.

BACKGROUND

Computer networks are essential modern business and enterprise tools. Networked computers facilitate global commerce and allow people all over the world to collaborate on work, be entertained, and control important aspects of society's technical infrastructure. It is extremely important that computer networks be secure so as to prevent unauthorized use of computers and communications pathways (such as the public Internet and private communication links), which can result in malicious, harmful, or disruptive actions.

Some network security approaches are known in the art. For example, firewalls provide basic protection from unwanted outside access to a computer network. As other examples, U.S. Pat. Nos. 7,185,368, 7,290,283, 7,457,426, 7,512,980, 7,644,151, 7,886,358, and 7,895,326, all of which are owned by the assignee of the present invention(s), provide for various network security, monitoring, and control functions, including flow-based network intrusion detection and monitoring, network port profiling, packet-sampling flow-based detection of network intrusions, and network service zone locking. Other examples of network security technologies include malware/malicious software detection, prevention, and removal; internal access control; routing limitations; bot detection and tracking; packet tracing; denial of service (DOS) detection and prevention; and others.

Given the mobility and geographic dispersal of the modern workforce as well as the proliferation of cloud services and on-demand computing, it is difficult to accurately detect anomalies based on the data from a single observation point. Therefore, there is a need for improved computer resource anomaly detection, reporting, and handling, to which aspects and embodiments of the present invention(s) are directed.

BRIEF SUMMARY OF THE DISCLOSURE

The appended claims may serve as a summary of the subject matter of this disclosure. Stated in other words, without intending to limit any aspect of the claimed subject matter, and briefly described, aspects of the present disclosure generally relate to systems and methods for determining anomalies in network traffic and providing notification to the users of the computers that generated the network traffic for confirmation of the activities that resulted in the network traffic.

For example, the disclosed system detects suspicious network activity (e.g. contact with a known malicious server) and may record information regarding that suspicious activity. The system may gather information to supplement the recorded information (e.g. user IDs) and generate a user prompt from that gathered and recorded information to request confirmation from the user who produced the suspicious activity. The user prompts can be generated at any time in relation to the detection of the suspicious network activity (e.g. immediately or delayed), and the user's response, which the system may receive, can be in any form. Based on the user's response to the prompt, the system may modify the information regarding the suspicious activity and notify security analysts regarding the potential security breach.

As will be described in greater detail herein, aspects of the disclosed system include one or more sensors, databases, and engines operatively connected to monitor network activity and gather feedback and transmit information to security analysts regarding said activity. As will be understood, the present disclosure does not impose any limitations on the type, size, or quantity of network activity that may be monitored by the disclosed system. Moreover, the present disclosure does not impose any limitations on the type or size of network that may be monitored by the disclosed system.

In one embodiment, a computer system for monitoring a data communication network comprising: at least one processor configured for: receiving security event data from a sensor, the sensor operatively coupled to the data communication network for determining the existence of a client/server (or host/peer, client/host, or other computer-to-computer) connection on the data communication network, the client/server connection characterized by an exchange of packets between the client and server, wherein the security event data comprises a user identifier and an indication of the nature of the security event connection; matching the user identifier with a computer system associated with a particular user of the data communication network; transmitting a notification to the computer system associated with the particular user, the notification comprising the indication of the nature of the security event connection and a query as to the nature of the particular user's network activity; based upon receiving a response to the query, creating a security alert (or updating or amending a prior security alert) based on the response to the query and the security event data; assigning a priority to the security alert based on comparing the response to the query with a predetermined response database; and transmitting the security alert and the assigned priority to a computing system associated with security personnel (e.g. a security analyst) associated with the data communication network.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure.

FIG. 5A shows exemplary raw data as depicted in FIGS. 3A and 3B.

FIG. 5B shows exemplary alert data as depicted in FIGS. 3A and 3B.

FIG. 5C shows exemplary user ID queries as depicted in FIG. 3B.

FIG. 5D shows exemplary user IDs as depicted in FIG. 3B.

FIG. 5E shows exemplary alert prompts as depicted in FIGS. 3A and 3B.

FIG. 5F shows exemplary alert e-mails as depicted in FIG. 3B.

FIG. 5G shows exemplary user queries as depicted in FIG. 3A.

FIG. 5H shows exemplary user inputs as depicted in FIGS. 3A and 3B.

FIG. 5I shows exemplary user responses to alert e-mails as depicted in FIG. 3B.

FIG. 5J shows exemplary user responses to user queries as depicted in FIG. 3A.

FIG. 5K shows exemplary alert data and user responses as depicted in FIGS. 3A and 3B.

FIG. 5L shows exemplary merged alert data and user responses as depicted in FIGS. 3A and 3B.

FIG. 5M shows an exemplary security policy.

FIG. 5N shows an exemplary user engagement policy.

DETAILED DESCRIPTION

For the purpose of promoting an understanding of the principles of the present disclosure, reference will now be made to the embodiments illustrated in the figures and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates.

Whether or not a term is capitalized is not considered definitive or limiting of the meaning of the term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Further, one or more references may be incorporated by reference herein, as listed above (the "Incorporated References"). Any incorporation by reference is not intended to give a definitive or limiting meaning of a particular term. In the case of a conflict of terms, this document governs.

Aspects of the present disclosure generally relate to systems and methods for determining anomalies in network traffic and providing notification to the users of the computers that generated the network traffic for confirmation of the activities that resulted in the network traffic.

For example, the disclosed system detects suspicious network activity (e.g. contact with a known malicious server) and system may record information regarding that suspicious activity. The system may generate a user prompt from that information to request confirmation from the user who produced the suspicious activity. Based on the user's response to the prompt, the system may modify the information regarding the suspicious activity and notify security analysts regarding the potential security breach.

As will be described in greater detail herein, aspects of the disclosed system include one or more sensors, databases, and engines operatively connected to monitor network activity and gather feedback and transmit information to security analysts regarding said activity. As will be understood, the present disclosure does not impose any limitations on the type, size, or quantity of network activity that may be monitored by the disclosed system. Moreover, the present disclosure does not impose any limitations on the type or size of network that may be monitored by the disclosed system.

Exemplary Scenarios

Figure 1:
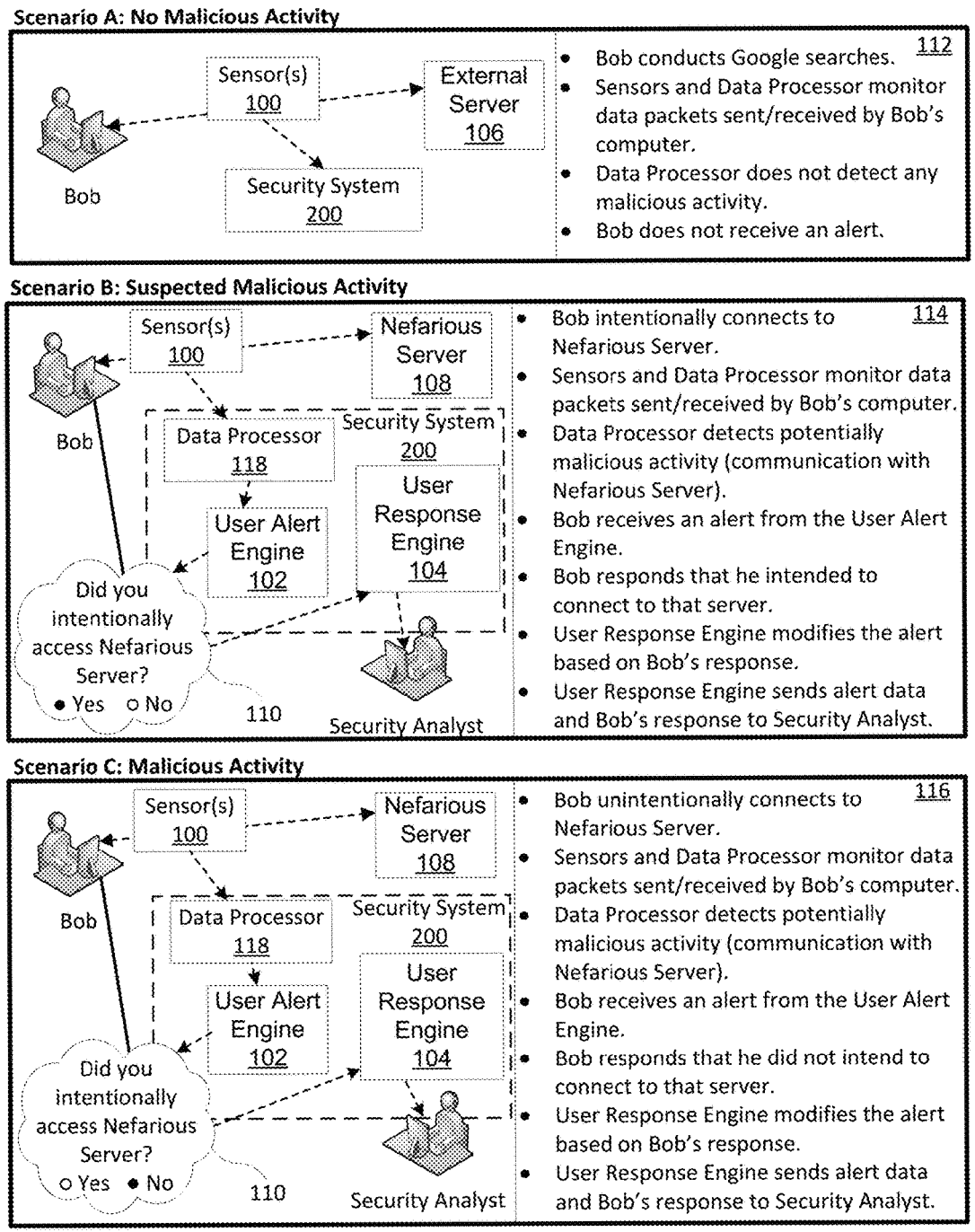
FIG. 1 shows exemplary data transfer scenarios monitored by the system featuring a particular exemplary employee ("Bob") of ACME Company.

Turning now to the figures, a particular example may be useful. In this example, as shown in FIG. 1, a salesman named Bob works for ACME Company. Continuing with this example, ACME Company has deployed at least some of the systems and methods described herein to determine whether Bob's computing behavior is a security threat. Continuing with this example, one of ACME's security concerns is contact with suspicious servers that may present a security risk. Accordingly, the ACME Company has deployed Sensors 100 and Security System 200 to monitor network traffic between computers within their network and external servers.

Scenario A

As shown in Scenario A of FIG. 1, Bob conducts Google® searches that are monitored by Sensors 100 and Security System 200. The Google searches generate data packets that are sent and received between Bob's computer and External Server or host 106. As the data packets do not indicate any data that could be perceived as a security threat, Security System 200 does not detect any malicious activity or generate any alerts.

Scenario B

As shown in Scenario B of FIG. 1, Bob intentionally connects to a suspect server, Nefarious Server 108. The Security System 200 monitors the network activity between Bob's computer and the Nefarious Server 108. In one embodiment, the Security System 200 comprises, among other elements, a Data Processor 118, a User Alert Engine 102, and a User Response Engine 104, operative as described below.

According to an aspect, the Security System 200 detects potentially malicious activity (e.g. connection to Nefarious Server 108) and transmits data to User Alert Engine 102. User Alert Engine 102 generates an alert that it transmits to Bob that requests his verification of the connection with Nefarious Server 108. Bob responds to the alert that he intended to connect to Nefarious Server 108. User Response Engine 104 receives Bob's response and modifies the alert based on his response by merging the user response with alert data. This modified (or merged) alert data is sent to a Security Analyst for analysis. In one embodiment, because Bob indicated that he intended to connect to the allegedly Nefarious Server 108 (which may or may not actually be nefarious), data resulting from the connection of Bob's computer to the server 108 and Bob's indication of intention to connect is stored in a data record for subsequent monitoring, adjustment of further user alerts, escalating or de-escalating a security concern, etc.

Scenario C

As shown in Scenario C of FIG. 1, Bob unintentionally connects to a suspect server, Nefarious Server 108. Data Processor 118 detects potentially malicious activity (e.g. connection to Nefarious Server 108) and transmits data to User Alert Engine 102. User Alert Engine 102 generates an alert that it transmits to Bob that requests his verification of the connection with Nefarious Server 108. Bob responds to the alert that he did not intend to connect to Nefarious Server 108. User Response Engine 104 receives Bob's response and modifies the alert based on his response. This modified or merged alert is sent to a Security Analyst for analysis.

According to one aspect, the alert priority for communications relating to the Nefarious Server 108 is increased due to the fact that the communications were not intentionally initiated by Bob. The alert priority may be represented by a numerical value indicative of a threat level presented by the Nefarious Server. The value of the alert priority, or the value of an increment to the value of the alert priority, may be adjusted in accordance with a determination by the Security Analyst, and thus may vary depending upon a number of factors considered by the Security Analyst or security policies associated with the organization.

The above example of "Bob the Salesman" (and any other examples), used herein are intended to be non-limiting and exemplary only.

Exemplary System Architecture

Figure 2:
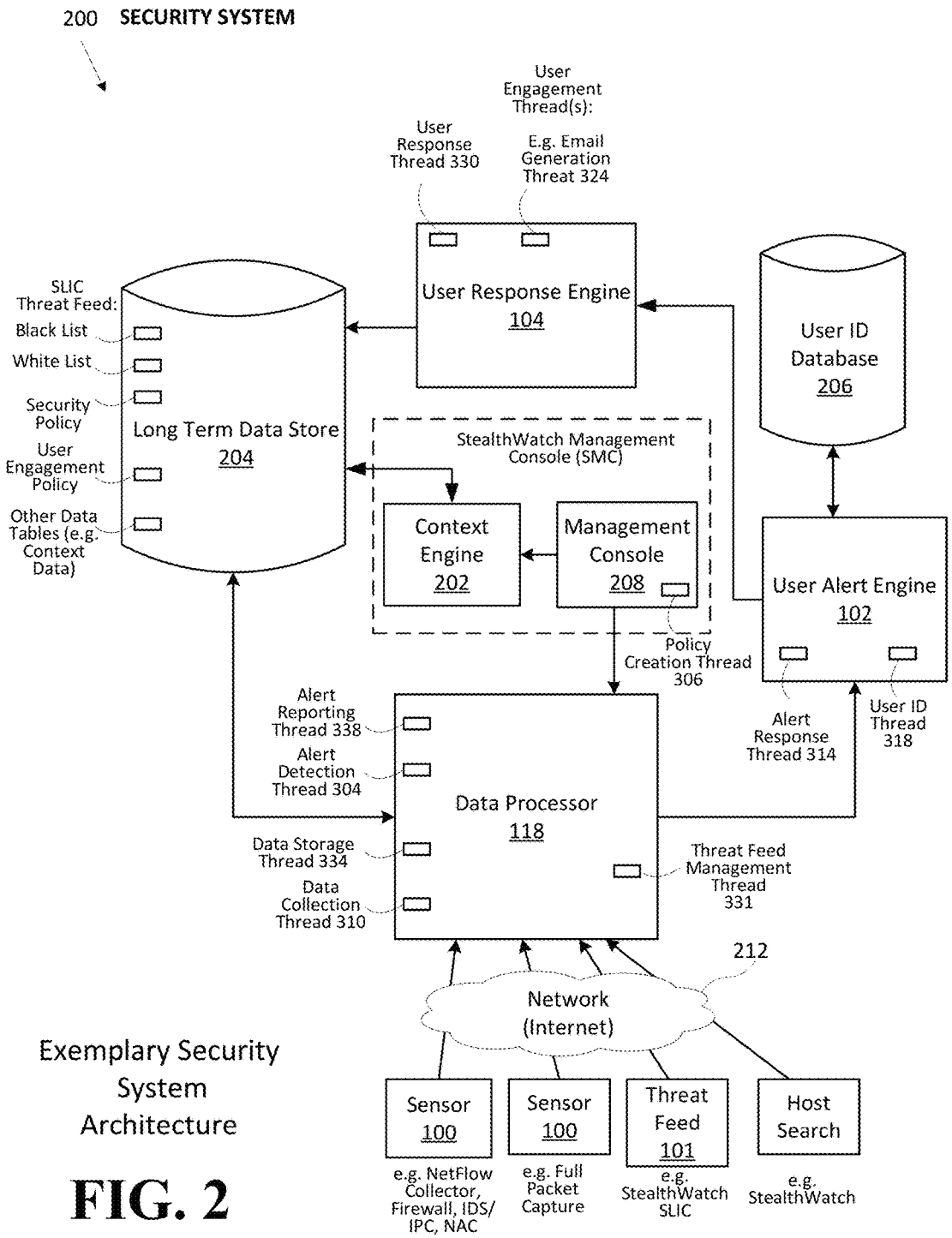
FIG. 2 shows an exemplary system for anomaly detection and notification featuring sensors.

FIG. 2 is a high-level block diagram of exemplary architectural components of a security system 200 constructed to carry out the methods, processes, and steps described herein. As will be understood by one of ordinary skill in the art, the system, architectural components, and operative connections/communication pathways shown in these figures are intended to be exemplary only. In various embodiments, the architectural components of the systems and methods described herein may be distributed architectures (even though shown as a single component). In particular embodiments, the architectural components may be operatively connected in any suitable way. As an illustrative example, although FIG. 2 does not show Context Engine 202 directly sending information to Sensors 100, one of ordinary skill in the art will understand that Context Engine 202 may send information directly to one or more of the Sensors 100.

According to an aspect, the security system 200 comprises one or more computing engines that carry out different aspects of the methods and processes described herein. By way of example but not limitation, the disclosed security system comprises a Data Processor 118, a User Alert Engine 102, a User Response Engine, a Management Console 208, and (optionally) a Context Engine 202. These processors (or engines) are all special-purpose computer systems specifically programmed to carry out operations relating to processing of high-speed networked communications for security threat detection and handling, which requires significantly more special purpose network traffic operations than a typical general purpose computer. Further, the security system 200 comprises one or more data storage devices for storing data resulting from and used in the operations described herein, for example, a Long Term Data Store 204 and a User ID Database 206. Further, one or more Sensors 100 are provided to obtain data derived from observing the network traffic between users and other devices (servers, hosts) on the network whose security is monitored.

As shown in FIG. 2, Sensors 100 may be any device capable of observing and measuring a behavior or computer communications, such as NetFlow Collectors, network monitoring platforms, log scanners, access control systems, geo-location services, and data acquisition systems. In particular, security (e.g. intrusion) detection systems such as those described in the Incorporated References may be used as one or more of the Sensors 100. In various embodiments, Sensors 100 receive information by monitoring network traffic and transmitting the packet headers from that network traffic to Data Processor 118. Examples of Sensors 100 include but are not limited to the packet header monitoring and packet sampling network traffic systems and methods described in the Incorporated References. Other examples of Sensors 100 include systems that capture aspects of packet exchange sessions delimited by known methods such as an acknowledgement (ACK) of receipt of one or more packets of a communication session, at link level or at higher levels within the known Open Systems Interconnection (OSI) data communications model.

According to an aspect, a determination of connection to a Nefarious Server can be made at any level within the OSI model, whether at the lowest layer (i.e. the physical layer) where connections are determined based on hardware addresses, or at a higher lawyer (i.e. the application layer), where identifiers of computing resources may not necessarily be limited to IP addresses, but may include further identifiers such as application name, session name or identifier, network identifier, etc. Therefore, although the described embodiments herein are typically couched in terms of using a network address such as IP address as an identifier of an actually or possibly nefarious server, those skilled in the art will understand that other types of identifiers of computing resources, not strictly limited to IP address, may be used as an identifier of an actually or possibly nefarious computing resource, and not strictly limited to a nefarious server that is totally nefarious.

According to an aspect, information relating to actual or possibly nefarious servers (or a nefarious computing resource within an otherwise tolerable server) may be provided to the system 200 by a threat feed 101. A threat feed, according to this aspect, is an external data source that is used to identify an actual or possibly nefarious server or computing resource. One example of a suitable external threat feed is the Lancope® StealthWatch® Labs Intelligence Center (SLIC) Threat Feed, available from Lancope, Inc., now a part of Cisco Systems, Inc. Details of the exemplary threat feed are available in the literature supplied by the manufacturer. Information from a threat feed, if used, is used to populate data fields in data tables, as described herein, that identify actual or suspicious servers or computing resources, provide names of certain particular security threats that have been assigned names as indicators of user convenience (as opposed to merely an IP address), provide a priority and/or severity and/or threat-level indicator that can be used to determine an urgency or frequency of engagement with a user or escalation of a particular threat to a security analyst, and the like.

According to another and related aspect, the known StealthWatch® system, made by Lancope, Inc., is a network security platform that provides a number of different network security functions that can be incorporated into a system and methods as disclosed herein. For example, the StealthWatch® system provides a network traffic monitoring capability and a security analyst management console that allows visibility into network operations in both physical and virtual network environments, including who is using the network (generating network traffic), what applications and services are in use on the network, performance characteristics (e.g. of applications, services, devices, hosts, clients, etc.), threat detection, and incident response. In particular, the StealthWatch® system provides a "host search" capability that provides, in response to a provided IP address, a return of data concerning a particular host or server identified by IP address. This return data includes information including but not limited to: first sent data (start date; a date and time the IP address first communicated on the network), last sent data (end date; a date and time the IP address last communicated on the network); total bytes data (the total number of bytes sent and received from the IP address); a flow collector identifier (an identifier of any sensors, such as flow collectors, that have seen the IP address); flow results (detailed flow data for the IP address); top peers data (data regarding the top peers, or clients, that have communicated with the host or server associated with the IP address).

According to one aspect, the present security system 200 is operative to automatically access the StealthWatch® host search functionality by providing one or more IP addresses of hosts or servers that have been detected from a sensor, and obtain detailed data regarding past communications with that particular server or host. In this aspect, the present system is operative to access the StealthWatch® host search capability to determine if a particular host or server has been previously seen on the network, as well as other prestored information relating to a threat or concern index associated with that host, for use in connection with a policy determination as described elsewhere herein, e.g. whether to generate a query about a connection to that host or server to a user. Further, in the event that a particular host or server has not been seen before, as reflected in data provided from a StealthWatch® host search, information regarding such a newly-seen host or server is used as a part of a policy determination whether to generate a query about a connection to that host or server to a user, for example to query whether the user intended to connect to that newly-appearing host or server.

Further details regarding the operations of the StealthWatch® host search capability are available in the literature supplied by the manufacturer.

According to one aspect, Data Processor 118 is operatively connected to Management Console 208, which allows a user (a Security Analyst type user) to define the parameters that trigger an alert from Data Processor 118. In general, Management Console 208 may be a computing engine similar to that shown in FIG. 6 or another device capable of receiving inputs regarding and defining parameters that trigger an alert, such as computers, tablets, and mobile phones. In various embodiments, Data Processor 118 compares the packet headers of the network traffic to the parameters from Management Console 208 and transmits alerts to Long Term Data Store 204 ("LTDS") and User Alert Engine 102 over a network 212. User Alert Engine 102 processes an alert in preparation for sending a request to the user. User Alert Engine 102 is connected to User ID Database 206 and User Response Engine 104. In various embodiments, User ID Database 206 contains an index of user IDs, their corresponding e-mail addresses within a particular network, and the user's currently known IP address. Additionally, User Alert Engine 102 may optionally query User ID Database 206 to determine the user ID, e-mail address, or IP address of the user whose activities generated an alert.

User Alert Engine 102 may transmit a prompt to User Response Engine 104. That prompt may generate a query to a user to determine more information regarding an alert. User Response Engine 104 may, in various embodiments, receive and process user responses to those queries. In various embodiments, User Response Engine 104 is connected to LTDS 204. User Response Engine 104 may store the user response in LTDS 204. Context Engine 202 may be operatively connected to LTDS 204. In various embodiments, LTDS 204 stores relevant information for the system, including alert data and user responses. LTDS 204 may include any suitable one or more databases and may be local storage or cloud storage or both. LTDS 204 may include one or more processors, one or more cores, one or more virtual instances, one or more database partitions, and/or one or more devices for carrying out suitable functionality as described herein, such as, for example, storing data, responding to data queries, and transmitting various types of data to system administrators and/or other system components.

LTDS 204 may also store other data useful in carrying out the methods described herein. As one specific example, LTDS stores data received from Threat Feed 101, which comprises information useful for identifying known nefarious servers, stored in a list of such known nefarious servers. As another and related example, LTDS stores data corresponding to known nefarious servers in a "black list" of servers that would trigger an alert in response to a user connection (assuming that other parameters of the alert are also satisfied, as discussed further below).

As another and related but optional example, LTDS 204 may store data corresponding to known acceptable servers stored in a "white list" of servers that would not normally trigger an alert (generally because that server has been previously cleared of being nefarious, or has been flagged or tagged by a user or by a security analyst as eligible for white list status), absent other factors of nefariousness such as communications on an unexpected port, or execution of an unexpected application, or connection for an unexpected duration, or connection at an unexpected time, or other indicators of nefarious activity on an otherwise-acceptable ("white listed") server. Such a white list associates a particular user with a white-listed (i.e. acceptable) IP address, as well as further specification of acceptable ports, protocols, applications, etc.

Data such as black lists, white lists, duration parameters, time parameters, application parameters, etc. may be considered "context" information, in the sense that such information is supplemental to the mere identification of a server or host as being actually or possibly nefarious, and used in conjunction with server ID information to determine the existence and extent (or severity) of a threat from a particular server or host. Such data may be stored in the LTDS 204 in other data tables, in addition to those shown and discussed in more detail below.

Still referring to FIG. 2, in one embodiment a Context Engine 202 is shown operatively coupled between the Management Console 208 and the LTDS 204. According to an aspect, the Context Engine 202 provides certain functionality provided by a StealthWatch® Management Console (SMC). A StealthWatch® Management Console (SMC) provides a primary interface for a Security Analyst to interact with a system constructed as described herein, allows the user (Security Analyst) to submit queries into the data stored in the LTDS 204, and display query results, all to assist in the operations described herein. The preferred SMC is manufactured by the assignee of the present application and invention; details of the functionality and operations of the preferred SMC are available in the literature supplied by the manufacturer. The Context Engine 202 represents features and functions of the SWC that allow a security analyst to provide security incident "context" to the detection of connections to suspected and known nefarious servers, such as data correlation, traffic visualization, consolidated reporting, detection and prioritization of security threats (including security alerts, user response, priority assignment, concern index assignment and monitoring), pinpointing network misuse and performance issues, security policy management, user engagement policy management, and incident response management. Therefore, those skilled in the art will understand and appreciate that the Context Engine 202 and Management Console 208 may be implemented by a StealthWatch® Management Console (SMC), modified to operate as described herein.

Exemplary Data Processes and Items

Figure 3A:
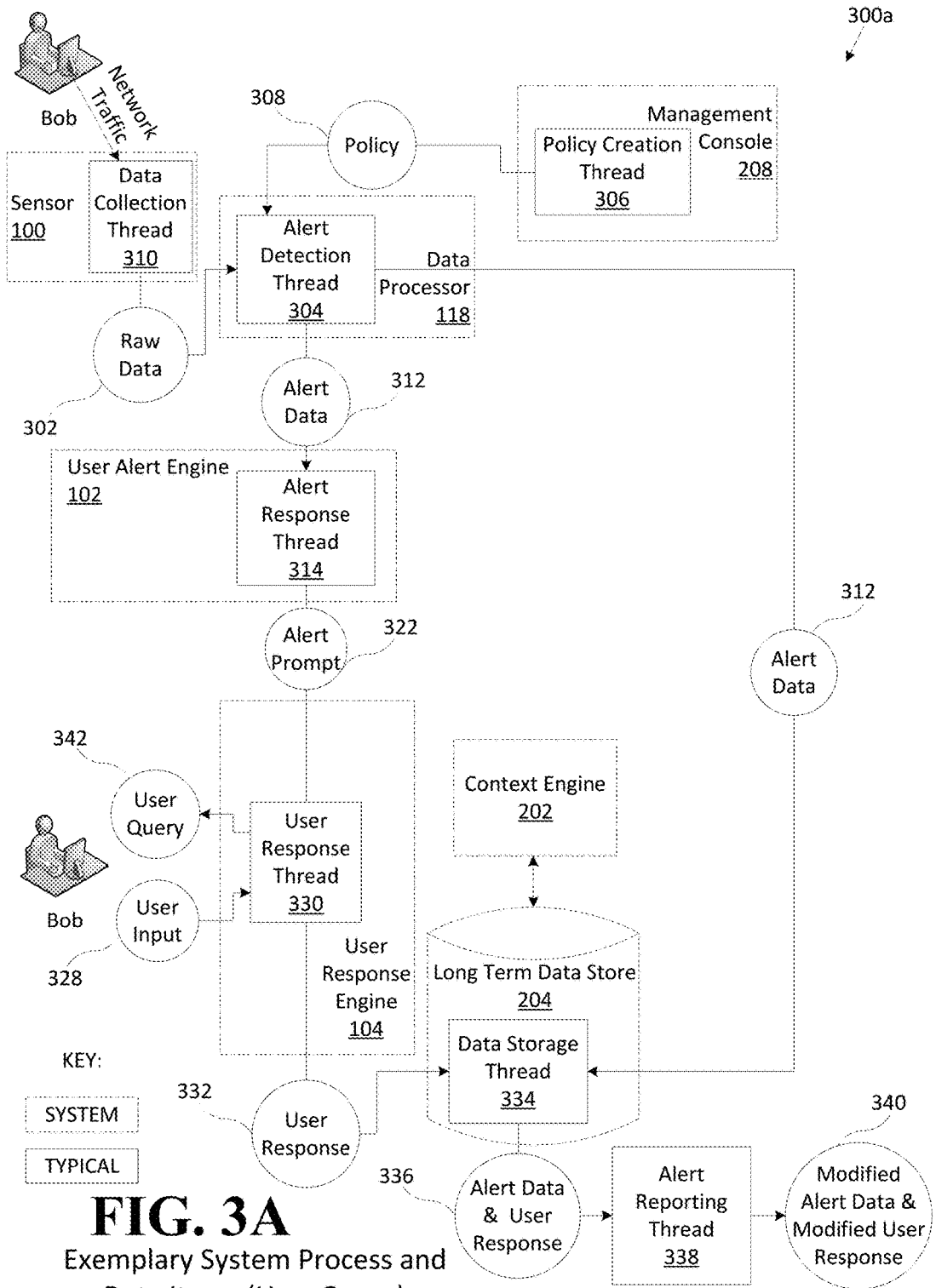
FIG. 3A is an exemplary block diagram depicting exemplary system architectural components, various exemplary program threads thereof, and exemplary data items exchanged between the exemplary architectural components for a user query embodiment of the present system and methods.
Figure 3B:
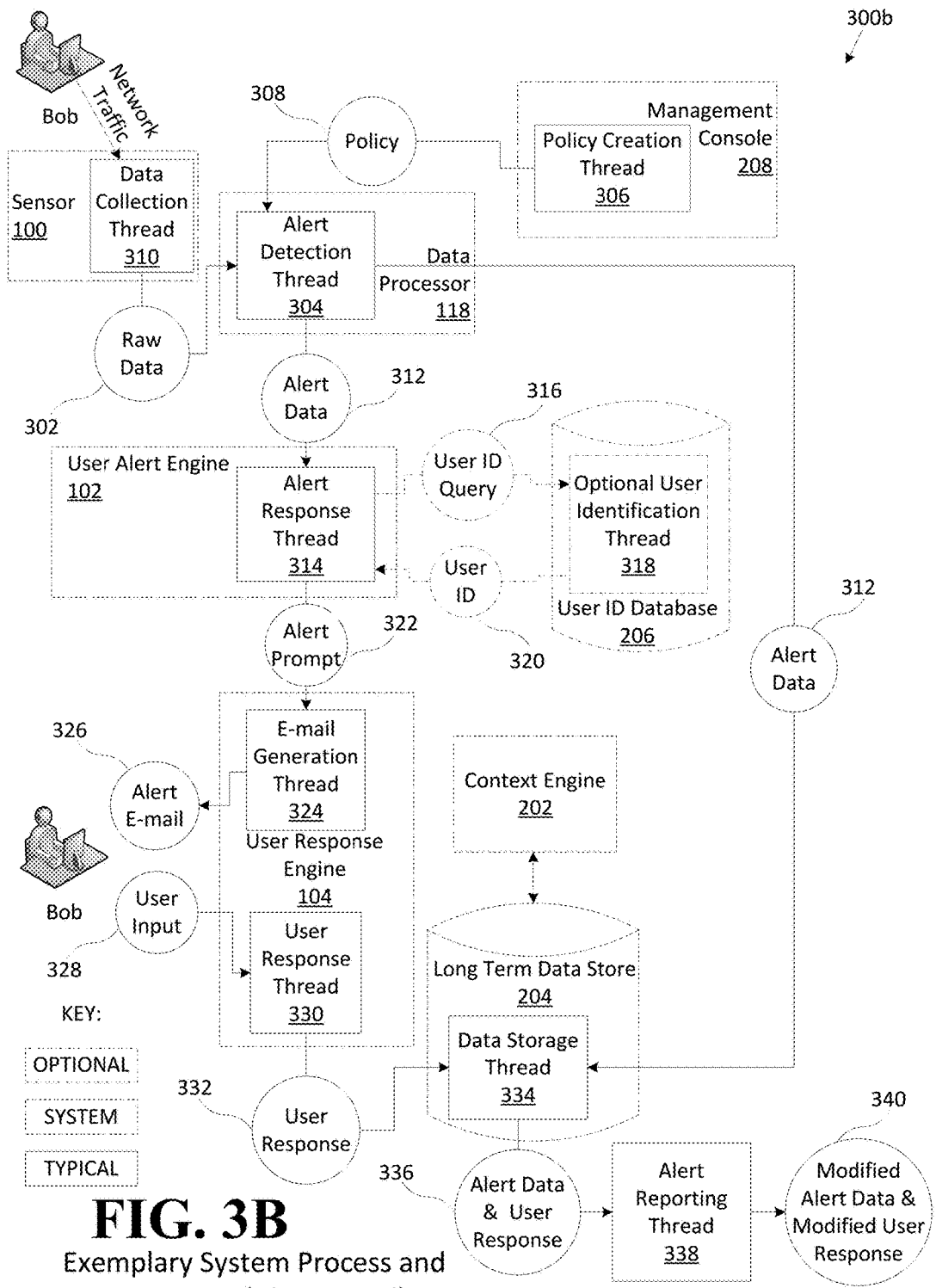
FIG. 3B is an exemplary block diagram depicting exemplary system architectural components, various exemplary program threads thereof, and exemplary data items exchanged between the exemplary architectural components for an alert e-mail embodiment of the present system and methods.

FIG. 3, consisting of FIGS. 3A and 3B, depicts exemplary system processes and data items in relation to the various architectural components discussed herein. It will be understood by one of ordinary skill in the art that the system may execute the processes in FIG. 3 in any suitable order and may use more than one architectural component to execute one or more steps of a given process. As such, the processes and data items shown in FIG. 3 are intended to be non-limiting and are included to help clearly explain the systems and methods herein. The data from FIG. 3, generally, will be described in greater detail in connection with the explanation of FIG. 5.

According to an aspect, a system 200 constructed as described herein will execute some or all of the following computer program modules or threads in the various engines shown, it being understood that a "thread" corresponds to a particular routine or algorithm that can be executed by one or more of the engines independently of other threads. While one thread may be dependent on another thread for its data input or for taking its data output, those skilled in the art will understand that each thread described herein represents a distinct computing process with inputs, outputs, storing and retrieving of data, timing requirements, and synchronization requirements. It will therefore be appreciated that a system as described herein can readily be implemented in multi-processing or multi-tasking manner, on one or more physical or virtual machines, locally or in a cloud-computing environment. According to various aspect of this disclosure, exemplary modules or threads shown in FIG. 2 include a Data Collection Thread 310, a Data Storage Thread 334, an Alert Detection Thread 304, an Alert Reporting Thread 338, an Alert Response Thread 314, a User Response Thread 330, a User ID Thread 318, a User Engagement Thread (which may be an Email Generation Thread 324, a Text Messaging Generation Thread, a Browser Thread, or a combination thereof), a Policy Creation Thread 306, a Threat Feed Management Thread 331.

User Queries

FIG. 3A depicts an exemplary system process and data items relating to a user query in response to detection of an alert situation derived from monitoring the user's connections to a server or host in a network. In this example, a user receives a query from the system, for example in the form of a user interface generated at the user's computer. In one aspect, the query can be generated with a special purpose computer program that executes on the user's computer, generates the query, receives the user's input ("yes" or "no" as to intention to connect to the server or host in question), and communicates with the system 200. In another aspect, the query can be generated through the user's web browser, for example during a web session conducted by the user, and for example by a browser-executable script or plug-in or add-on, forms of which are known to those skilled in the art.

In one embodiment, Sensor 100 monitors network traffic and collects/receives Raw Data 302 from that traffic by stripping the packet headers from the data packets that comprise the network traffic as part of Data Collection Thread 310 (e.g., see U.S. Pat. No. 7,185,368, filed Nov. 30, 2001, entitled "Flow-Based Detection of Network Intrusions," incorporated herein by reference in its entirety). In various embodiments, Raw Data 302 may be any information regarding network activity between internal computers and external servers. According to one embodiment, Sensor 100 transmits Raw Data 302 to Data Processor 118. As will be understood by one of ordinary skill in the art, Sensor 100 and Data Processor 118 do not have to be separate devices and can instead be one device that performs the functions of both Sensor 100 and Data Processor 118.

In various embodiments, Data Processor 118 is operatively connected to Long Term Data Store (LTD S) 204, User Alert Engine 102, and Management Console 208. In general, in various embodiments, Management Console 208 generates and stores a Security Policy 308 as part of a Policy Creation Thread 306. In particular embodiments, Policy 308 contains parameters regarding network activity that define suspicious or harmful network activity that would trigger an alert. In particular embodiments, Data Processor 118 evaluates Raw Data 302 as part of Alert Detection Thread 304 and compares Raw Data 302 to the parameters of Policy 308. Alert Detection Thread 304 may be used to determine whether suspicious or harmful network activity is occurring, which could result in the generation of an alert. In further embodiments, based on the results of the evaluation (e.g., a determination that Raw Data 302 constitutes suspicious or harmful network activity as defined in Policy 308 by comparing, and matching, Raw Data 302 to the parameters in Policy 308), Data Processor 118 may be configured to transmit Alert Data 312 to LTDS 204 and User Alert Engine 102.

In various embodiments, Alert Data 312 contains information regarding the suspicious activity as identified by Alert Detection Thread 304. In various embodiments, User Alert Engine 102 can generate Alert Prompt 322 in real-time (e.g., immediately after receiving Alert Data 312), can wait a predefined period before generated Alert Prompt 322 (e.g. 24 hours), can generate Alert Prompt 322 at a predefined time (e.g. 7:00 pm), or can compile several instances of Alert Data 312 into one Alert Prompt 322.

User Alert Engine 102 is operatively connected to User Response Engine 104 and Data Processor 118. User Alert Engine 102 receives Alert Data 312 and processes it in Alert Response Thread 314. In various embodiments, Alert Process Thread 314 determines how to transmit an alert and who to transmit the alert to. Alert Response Thread 314 can generate Alert Prompt 322 that is transmitted to User Response Engine 104.

User Response Engine 104 is operatively connected to LTDS 204 and User Alert Engine 102. User Response Engine 104 receives Alert Prompt 322 and processes it in User Response Thread 330 to generate User Query 342. In various embodiments, User Query 342 is a request to a user (e.g., Bob, from the example above) for confirmation regarding the activity that generated the alert (e.g., "Did you intentionally access Nefarious Server?"). In various embodiments, User Query 342 can also include requests for information such as why the user contacted Nefarious Server, the frequency of this type of connection (e.g., one-time, occasional, regular), tags classifying this type of connection (e.g., "Marketing Team" or "Partner Up-Load"), comments explaining the connection (e.g., in free form text), etc.

User Query 342 is transmitted to the user, Bob, and in various embodiments, received in Bob's browser and provided as a pop-up notification or similar user interface that permits display of information to the user relating to the alert and receipt of information provided by the user. The user, Bob, responds with User Input 328, which User Response Thread 330 receives and processes to generate User Response 332. In various embodiments, User Input 328 can be as simple as a "yes" or "no" response. In various embodiments, User Input 328 can include responses to requests for information such as why the user contacted Nefarious Server, the frequency of this type of connection (e.g., one-time, occasional, regular), tags classifying this type of connection (e.g., "Marketing Team" or "Partner Up-Load"), comments explaining the connection (e.g., in free form text), etc. User Response Engine 104 transmits User Response 332 to LTDS 204.

LTDS 204 receives both User Response 332 and Alert Data 312. Data Storage Thread 334 stores User Response 332 and Alert Data 312 together in LTDS 204 and transmits Alert Data & User Response 336 to Alert Reporting Thread 338. Alert Reporting Thread 338 processes Alert Data & User Response 336, generates a Merged Alert Data & User Response 340 that includes further information that may be useful in assessing the nature of the communication between the user and the server or host to which he or she connected, and transmits Merged Alert Data & User Response 340 to a security analyst for analysis.

Details of the Alert Data are shown and described below in connection with FIG. 5B, and details of the Merged Alert Data & User Response data are shown and described below in connection with FIG. 5L. For example, data that may be supplied by a user may include, but is not limited to (1) an indication whether or not communication to the identified server was intended, (2) if yes, an expected future frequency of communications with the identified server, (3) optional tags or other identifiers (e.g. "Partner," "Marketing", "Customer", etc.), and (4) optional comments by the user relating to the server or to the circumstance of connection.

In various embodiments, Alert Reporting Thread 338 may transmit Merged Alert Data & User Response 340 in real-time (e.g., immediately after receiving Alert Data & User Response 336), can wait a predefined period before transmitting Merged Alert Data & User Response 340 (e.g. 24 hours), can transmit Merged Alert Data & User Response 340 at a predefined time (e.g. 7:00 pm), or can compile several instances of Alert Data & User Response 336 into a combined Merged Alert Data & User Response 340.

Alert E-mails

According to another aspect, the system 200 engages with a user via other communication methods such as emails, or SMS (text) messaging. Now referring to FIG. 3B, an exemplary system process and data items are shown for alert e-mails, it being understood that a similar process and data items are required for an alert text message engagement mechanism. As shown, the embodiment in FIG. 3B is similar to the embodiment shown in FIG. 3A, except that FIG. 3B relates to an exemplary system process for alert e-mails, whereas FIG. 3A pertains to user queries through a special program user interface or browser script. Accordingly, except as discussed below, the discussion of FIG. 3A also applies to FIG. 3B.

In one embodiment, User Alert Engine 102 is also connected to User ID Database 206. Accordingly, Alert Response Thread 314 transmits User ID Query 316 to User ID Database 206. User ID Database 206 runs Optional User Identification Thread 318 based on User ID Query 316 and returns User ID 320 corresponding to Alert Data 312 to Alert Response Thread 314. Alert Response Thread 314 can generate Alert Prompt 322 that is transmitted to User Response Engine 104.

It will be understood and appreciated that the User Identification Thread 318 may also be used in the process of FIG. 3A involving a user query, for example, to enable the system to access information relating to the particular user, based on User ID 320, and use that information in determining an appropriate user engagement policy, as described elsewhere herein. As a specific example, the User ID 320 can be used to access a user engagement policy that allows the user to select a form of communication (user query, email, text), as well as other aspects of engagement such as frequency of communication, content of communications, manner of input of information, escalation or de-escalation of an alert, etc.

Referring back to FIG. 3B, in one embodiment, User Response Engine 104 receives Alert Prompt 322 and processes it in E-mail Generation Thread 324 to generate Alert E-mail 326. In various embodiments, Alert E-mail 326 is an e-mail to the user, Bob, for confirmation regarding the activity that generated the alert (e.g., "Did you intentionally access Nefarious Server?"). In various embodiments, Alert E-mail 326 can also include requests for information such as why the user contacted Nefarious Server, the frequency of this type of connection (e.g., one-time, occasional, regular), tags classifying this type of connection (e.g., "Marketing Team" or "Partner Up-Load"), comments explaining the connection (e.g., in free form text), etc. In various embodiments, Alert E-mail 326 is transmitted to the user's e-mail address (e.g., Bob's e-mail address). In other embodiments, an alert similar to Alert E-mail 326 is transmitted to the user's mobile device via a text message (SMS). The user, Bob, responds with User Input 328, which User Response Thread 330 receives and processes to generate User Response 332. In various embodiments, User Input 328 can be received via a reply e-mail, or via an input into a form that is submitted via the internet, text message reply, etc.

Exemplary Process Flow

Figure 4:
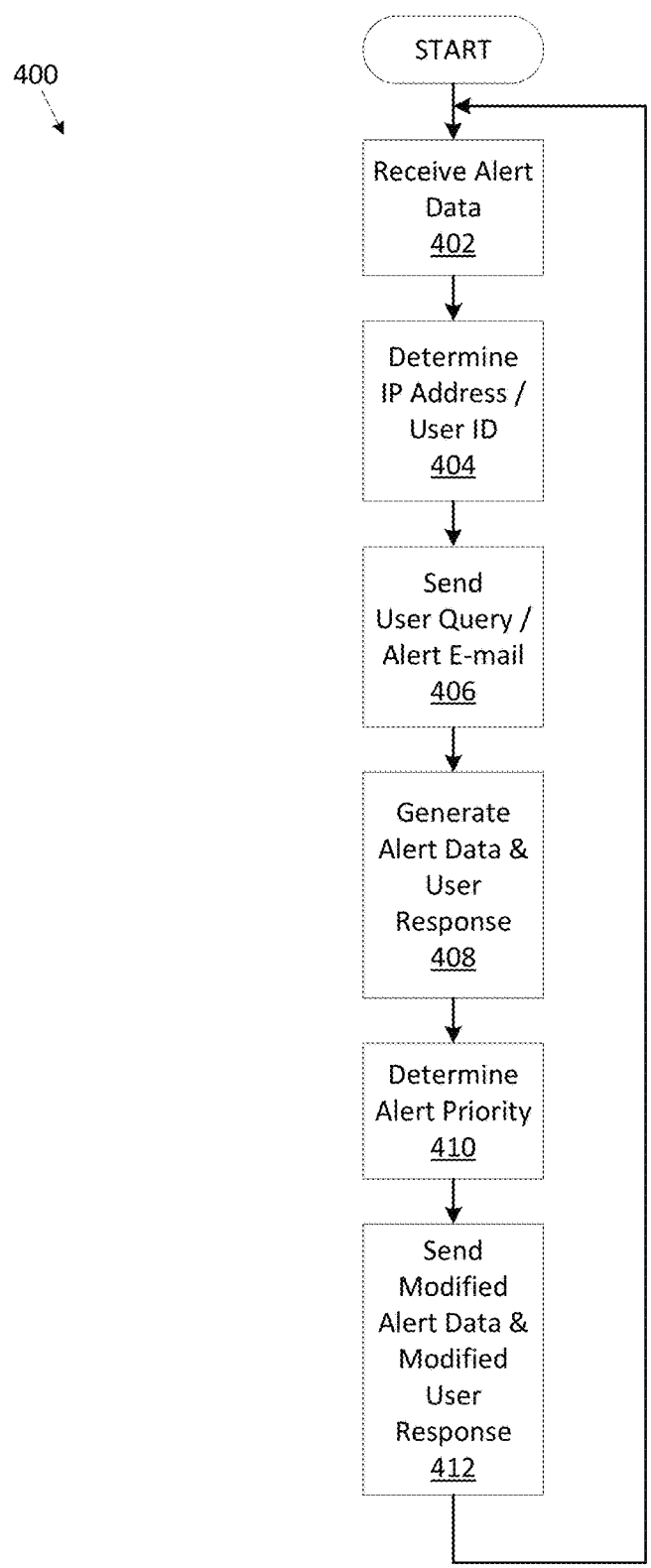
FIG. 4 is a flowchart showing an exemplary process flow for collecting alert data, sending user queries or alert e-mails, and notifying a security analyst of the user response as depicted in FIGS. 3A and 3B.

Turning now to FIG. 4, a flowchart representing an exemplary process flow 400 of the overall system 200 is shown. It will be understood that the process 400 represents an overall process of the entire system 200, which is effect through the various discrete computational threads that are described for the various engines of the exemplary system 200. Those skilled in the art will understand how each of the various described threads should be coded in order to carry out the functions of each thread, involving the data items as will be described, to effect the overall function of the system that is generally shown in FIG. 4.

In one embodiment, at step 402, the system 200 receives alert data. Alert data comprises Alert Data 312 as shown in FIGS. 3A and 3B, which is derived from one or more sensors 100 during monitoring of the user's communications with servers or hosts in the monitored network. At step 404, the system determines the IP address of the computer or User ID of the user that generated the network activity that forms the basis of the alert data. In various embodiments, step 404 is performed by Data Processor 118 and User Alert Engine 102 from FIG. 3. At step 406, the system transmits a user query or alert e-mail (or alert text message) to the user for confirmation regarding the alert data. As previously described, in various embodiments, the user query is a notification in a browser on the machine at the IP address that requests the user to respond whether the suspicious network activity was intentional. In various embodiments, the alert e-mail is sent to the User's e-mail address based on the User ID and requests the user to respond whether the suspicious network activity was intentional. In various embodiments, step 406 is performed by User Response Engine 104.

Based on the user's response, at step 408, the system generates a compilation of the alert data and user response. At step 410, the system compares the compilation of alert data and user response to other alert data and users responses to determine the alert's priority (e.g., whether the alert should be considered more important than other alerts and therefore require immediate attention). In one embodiment, the alert priority is added to the compilation of alert data and user response to create merged alert data and user response. This merged alert data & user response is transmitted to a security analyst at step 412 for further analysis of the alert. In various embodiments steps 408-410 are performed by various of the described computational threads and the data involved in such processing stored in Long Term Data Store 204.

After transmission of the merged alert data & user response at step 412, the process 400 repeats in a continuous loop, responding to other connections by other users. Although the process 400 is shown as a continuous (infinite) loop with discrete, sequential steps, it will be understood that each of the steps shown is preferably coded using the various described discrete but interdependent computational threads described herein. It will of course be appreciated that the individual computational threads may be implemented as discrete executable threads, each having a lifetime that may be considered as having a distinct start and stop (or start and return) type execution, as will be known to those skilled in the art.

Exemplary Data

Referring now to FIGS. 5A-5O, exemplary data tables are shown for providing clarification regarding the various data that may flow through the system (as shown, for example, in FIG. 3). As will be understood in connection with the descriptions below, the various pieces of data may be modified by the system and may contain similar information. The following described data table are configured for storage in the Long Term Data Store 204, and accessed and updated by the various computational threads described herein, as part of the process 400.

FIG. 5A shows an exemplary raw data table stored in the Long Term Data Store 204 representing communications between a user and servers or hosts that may or may not be nefarious. In one embodiment, exemplary raw data corresponds to Raw Data 302 from FIG. 3, as generated by Data Collection Thread 310. Exemplary raw data typically comprises a plurality of discrete data entries or instances (e.g. each line in the table), each entry or instance comprising one or more data items or fields of specific information. In the example shown, an exemplary raw data entry includes data items comprising an identifier of the terminal (e.g., Terminal ID 1) from which the data originates, a timestamp, and information from the data packet headers of a communication between a user and a server or host that might or might not be nefarious. For example, a data entry in the raw data table includes the following data items or fields: a Terminal ID comprising an identifier of the user's machine, a time stamp of the generation of the data for a particular communication (in one aspect, of at least one packet; in another aspect, a collection of a plurality of packets of a flow); an application ID for an application that generated the data (e.g. a particular computing application involved in the communication between the user and the subject server or host), a source IP address (e.g., of Terminal ID 1, the user's machine), the destination IP address (e.g. of the subject server or host), the source port, and the destination port. One skilled in the art will appreciate that this information forms the basis for the monitoring conducted by Sensors 100 and Data Processor 118. In one embodiment, the first two entries of raw data correspond to Scenario A from FIG. 1. In some embodiments, the third entry of raw data corresponds to Scenario B from FIG. 1. In some embodiments, the fourth entry or instance of raw data corresponds to Scenario C from FIG. 1.

FIG. 5B shows a data table comprising exemplary alert data. In one embodiment, exemplary alert data correspond to Alert Data 312 from FIG. 3. In various embodiments, exemplary alert data contains a compilation of the data received by the Alert Detection Thread 304 from FIG. 3. Accordingly, exemplary alert data may contain a terminal ID, time stamp, application ID, source IP address, destination IP address, source port, destination port, alert ID, and alert category. In various embodiments, the alert category may be an indication of the severity of the alert or urgency of the alert.

FIG. 5C shows exemplary user ID queries, comprising exemplary data items of two queries at different points in time. In one embodiment, exemplary user ID queries correspond to User ID Query 316 from FIG. 3B. In various embodiments, exemplary user ID queries contain the source IP address, time stamp corresponding to an alert, and a null value field for User ID and E-mail address, to be filled in by user response. The exemplary user ID queries therefore comprise and contain a request for a user ID and an e-mail address of the user operating the computer that generated the data that forms the basis for the corresponding alert. These data values of user ID and e-mail address are obtained in the user response operation described herein.

FIG. 5D shows exemplary user ID responses (in this example, corresponding to the queries of FIG. 5C). The null data items in the queries of FIG. 5C are shown with values. In one embodiment, exemplary user IDs correspond to User ID 320 from FIG. 3B. In various embodiments, exemplary user IDs may be the result of exemplary user ID queries from FIG. 5C. Accordingly, the exemplary user IDs may contain the same information as the exemplary user ID queries (e.g., source IP address and time stamp) and also contain the user ID and e-mail requested by the exemplary User ID queries.

FIG. 5E shows a data table comprising exemplary alert prompts. In one embodiment, exemplary alert prompts correspond to Alert Prompt 322 from FIG. 3. In various embodiments, exemplary alert prompts contain the alert ID, terminal ID, time stamp, application ID, source IP address, destination IP address, user ID, and e-mail as a result of the Alert Response Thread 314 and are transmitted to the User Response Engine 104 from FIG. 3. Optionally, the alert prompt table may include fields for receiving other information from the user in an affirmative reply to a query about a communication, for example but not by way of limitation: an expected future frequency of communication with an identified host or server, tags, and/or comments provided by the user. See for example FIG. 5H for further details of such other data included in an alert prompt table.

FIG. 5F shows a data table comprising exemplary alert e-mails. In one embodiment, exemplary alert e-mails correspond to Alert E-mail 326 from FIG. 3B. In various embodiments, exemplary alert e-mails are generated, in response to an alert, to request input from a user regarding the alert and can be sent directly to the user's e-mail address. Accordingly, exemplary alert e-mails contain the alert ID, terminal ID, time stamp, application ID, source IP address, destination IP address, user ID, e-mail, and a request for a "yes" or "no" response from the user regarding the alert. In various embodiments, the response can be to a question such as "Did you intentionally access Nefarious Server?" as in Scenarios B & C from FIG. 1. In various embodiments, exemplary alert e-mails can also include requests for information such as why the user contacted Nefarious Server, the frequency of this type of connection (e.g., one-time, occasional, regular), tags classifying this type of connection (e.g., "Marketing Team" or "Partner Up-Load"), comments explaining the connection (e.g., in free form text), etc.

FIG. 5G shows a data table comprising exemplary user queries. In one embodiment, exemplary user queries correspond to User Query 342 from FIG. 3A. In various embodiments, exemplary user queries are generated, in response to an alert, to request input from a user regarding the alert and can be transmitted as a notification in the user's browser. Accordingly, exemplary user queries contain the alert ID, terminal ID, time stamp, application ID, source IP address, destination IP address, and a request for a "yes" or "no" response from the user regarding the alert. In various embodiments, the response can be to a question such as "Did you intentionally access Nefarious Server?" as in Scenarios B & C from FIG. 1. In various embodiments, exemplary alert e-mails can also include requests for information such as why the user contacted Nefarious Server, the frequency of this type of connection (e.g., one-time, occasional, regular), tags classifying this type of connection (e.g., "Marketing Team" or "Partner Up-Load"), comments explaining the connection (e.g., in free form text), etc.

FIG. 5H shows exemplary user inputs, for a simplified case of a user responding "yes" or "no" as to his or her intention to connect to a particular server or host. In one embodiment, exemplary user inputs correspond to User Input 328 from FIG. 3. In various embodiments, exemplary user inputs only consists of a "yes" or "no" in respond to exemplary user queries from FIG. 5G or exemplary alert e-mails from FIG. 5F. In various embodiments, if the user intended the action that generated the alert, the user responds "yes," as in Scenario B from FIG. 1. In various embodiments, if the user did not intend the action that generated the alert, the user responds "no," as in Scenario C from FIG. 1.

In various embodiments, further to a simple "yes/no" response, exemplary and optional user inputs can also include responses to requests for information such as why the user contacted Nefarious Server, an expected frequency of this type of connection (e.g., one-time, occasional, regular), tags classifying this type of connection (e.g., "Marketing Team" or "Partner Up-Load"), comments explaining the connection (e.g., in free form text), etc. Those skilled in the art will understand that the system 200 may be constructed to solicit various other information from a user relating to his or her connection to a particular server or host, as a part of a larger process of collecting information from the user resulting from that connection, which could be useful to security analysts in determining the severity of the threat or risk from that particular server or host, with respect to that particular user, or a class of users, or the enterprise as a whole.

FIGS. 5I and 5J show data tables comprising exemplary users responses for alert e-mails and user queries, respectively. In one embodiment, exemplary user responses correspond to User Response 332 from FIG. 3. In various embodiments exemplary user responses, as shown in FIG. 5I, are a compilation of the data from exemplary alert e-mails, as in FIG. 5F, and exemplary user inputs, as in FIG. 5H. Accordingly, as shown in FIG. 5I, exemplary user responses contain the alert ID, terminal ID, time stamp, application ID, destination IP address, user ID, e-mail, and "yes" or "no" response from the user. In various embodiments exemplary user responses, as shown in FIG. 5J, are a compilation of the data from exemplary user queries, as in FIG. 5G, and exemplary user inputs, as in FIG. 5H. Accordingly, as shown in FIG. 5J, exemplary user responses contain the alert ID, terminal ID, time stamp, application ID, source IP address, destination IP address, and "yes" or "no" response from the user.

FIG. 5K shows a data table comprising exemplary alert data & user responses. In one embodiment, exemplary alert data & user responses corresponds to Alert Data & User Response 336 from FIG. 3. In various embodiments, exemplary alert data & user responses is a compilation of exemplary alert data from FIG. 5B and exemplary user responses from FIGS. 5I and 5J. Accordingly, exemplary alert data & user responses contains the alert ID, terminal ID, data packet, time stamp, application ID, source IP address, destination IP address, source port, destination port, alert category, and user input for the corresponding alert.

FIG. 5L shows a data table comprising exemplary modified alert data & user responses. In one embodiment, exemplary modified alert data & user responses corresponds to Merged Alert Data & User Response 340 from FIG. 3. In various embodiments, exemplary merged alert data & user responses is an augmentation of exemplary alert data & user responses from FIG. 5K. Accordingly, exemplary merged alert data & user responses contains the alert ID, terminal ID, data packet, time stamp, application ID, source IP address, destination IP address, source port, destination port, alert category, and user input for the corresponding alert along with index points and an indication of any other relevant alerts.

In various embodiments, index points correlate to the alert category and user input and are determined by an algorithm. As a specific example, index points correspond to a concern index value as described in the Incorporated References. Index points (or concern index values) may be collected and accumulated by the system 200, and used in connection with information derived from users in the system and methods described herein, to modify or supplement the determination of a threat level presented by a particular server or host. Stated in other words, and according to one aspect, a particular server or host, at the beginning of a communication session with a user, may have an initial concern index value corresponding to a particular beginning threat level, which results in an alert generated to a user as described herein. That initial concern index value or index points may be modified automatically, or as a result of security analyst review, to change the index points or concern index value for subsequent communications with that server or host, for the particular user or for the enterprise in general. In this manner, the present system and processes may be used in conjunction with other network security systems and processes, to augment an existing network security monitoring system and provide additional functionality based on user input and feedback resulting from communications with servers or hosts out in the network.

In various embodiments, other relevant alerts can be identified based on the user ID, source IP address, destination IP address, etc. For example, because alerts ABCD and EFGH were generated in response to Bob's actions, as in Scenarios B and C from FIG. 1, alert EFGH is associated with alert ABCD when it is reported to a security analyst.

FIG. 5M shows a data table comprising exemplary security policies. In one embodiment, exemplary security policies correspond to Policy 308 from FIG. 3. In various embodiments, exemplary security policies are defined by and received from an administrator (e.g. security analyst) and include various parameters that trigger an alert from Data Processor 118.

In the exemplary policy shown in FIG. 5M, a security policy contains data that indicates that an accessed (or accessible) computer system in the network, whether in a local network or a larger network such as the Internet, is permitted or not permitted, for a particular identified user, to execute a particular application program for or on behalf of a particular user, and/or to communicate on specified port(s), and/or to communicate using specified protocol(s). In this example of FIG. 5M, the security policy comprises a mapping of a particular address of the accessed (or accessible) computer and an identifier of a permitted (or unpermitted) application, port, and/or protocol. The example of FIG. 5M shows a data table, stored in the long term data store 204, associating an application ID (e.g., an identifier for an application that generates data) and a destination IP address of a computer and/or service that may execute that application. Optional data fields are also shown for permitted ports and/or protocols (it being understood that merely because a particular IP address of a server is allowed for communications, particular applications, ports, or protocols may not be permitted). A policy may be permissive (e.g. "yes" the destination IP address computer is permitted communicate, and/or to run that application, on a particular port, and/or using a particular protocol), or denying permission (e.g. "no" the destination IP address computer is not permitted to run that application, or use a particular port or protocol, whether or not other communications with at the IP address are otherwise permitted).

In the case of a denial of a permission (whether of IP address, application, port, and/or protocol, as determined by the policy), the Alert Detection Thread 304 would generate Alert Data 312 indicating a possible alert situation, which is processed as described above. In the case of a permissive policy, however, no alert is generated. It will be appreciated that providing a permissive policy allows the system to record the fact that a particular computer system may have once triggered an alert, but the user has indicated that he or she intended to access that computer and application, so as to prevent the issuance of "false positive" alert in the event that the particular computer system at that destination IP address has other applications that are not permitted for this or other users.

According to another aspect, an exception to a security policy may be created by a Security Analyst and reflected in a security policy table as shown in FIG. 5M. For example, if a user provides a response to a query indicating "Yes, I intended to contact that server and intend to do so again," the Security Analyst may create a policy exception that will allow the user to communicate with the specified server in the future, without generating a security alert. It will be appreciated that such an exception may be created on a user by user basis, i.e. a permitted communication to one user might not be permitted for another user, in which case information would be stored in the table of FIG. 5M, or elsewhere, indicating permissions and policy exceptions by user. Accordingly, a security policy is referenced upon communications with the identified server, and alerts generated or inhibited, as determined by the prestored data indicating a security policy exception. Absent an exception in a security policy, a security alert will be generated as described herein.

According to one embodiment, Data Processor 118 compares the parameters from exemplary policies to their corresponding attributes in the received Raw Data 302; if Data Processor 118 determines that the data in Policy 308 matches the data in Raw Data 302 (e.g., the application ID and destination IP address from the exemplary policy in FIG. 5M matches the application ID and destination IP address from exemplary raw data), then, based on that comparison, Alert Data 312 is generated by the Alert Detection Thread 304. In some embodiments, the third and fourth instances of exemplary raw data in FIG. 5A, corresponding to Scenarios B and C respectively from FIG. 1, match the first and second instances, respectively, of exemplary policies. Further, in some embodiments, this match results in the first and second instances, respectively, of exemplary alert data in FIG. 5B.

In various embodiments, other relevant context-based parameters can be included in exemplary policies, such as connection duration, connection frequency, etc., and exemplary policies can be defined per employee, role, or groups within an organization. According to an aspect, the Context Engine 202 (FIG. 2) executes a context thread or module that works in conjunction with the Management Console 208 to generate a context information user interface for receiving context information such as that described above, storing that context information in the Long Term Data Store 204 (or in the User ID database) and in stored policies, so as to associate information useful in generating alerts, user prompts, receipt of user-input information about various hosts or servers that are the subject of an alert, determine a frequency and/or nature of user engagement, provide a priority or urgency or threat level indicator by a user or a security analyst, and any other context-specific information that may occur to those skilled in the art.

In further embodiments, exemplary policies are defined automatically in response to various sources, such as index points, alert categories, input/feedback from security analysts, etc.

FIG. 5N shows an exemplary user engagement policy, stored and used in aspects of the disclosed system. In one embodiment, a user engagement policy provides data for use in determining a manner or type, frequency, scope, or other aspect of providing a user with alert prompts or emails when an alert is generated. For example, FIG. 5N shows data fields in an exemplary user engagement policy corresponding to user ID, alert frequency, alert category, engagement type. In one aspect, a user may be indicated as having elected to receive alerts on a periodic basis ("no more than once per hour"), rather than immediately upon each alert. In particular, embodiments of the disclosed system 200 will be operative to prevent users from being interrupted with queries more often than a predetermined specified frequency of interruption, e.g. alert frequency.

In another aspect, a user may be indicated as having elected to receive alerts only from one or more predetermined alert categories, or predetermined concern index values. In another aspect, a user may be indicated as having elected to receive alerts by email, or by text message, or by browser script execution to interrupt a web browsing session, or other session interruption type mechanism.

Exemplary Hardware Overview

According to one embodiment, the techniques, processes, and methods described herein are implemented in the disclosed system 200 by one or more special-purpose computing devices that are configured to implement the various computational engines, e.g. data processor 118, user alert engine 102, user response engine 104, context engine 202, etc. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
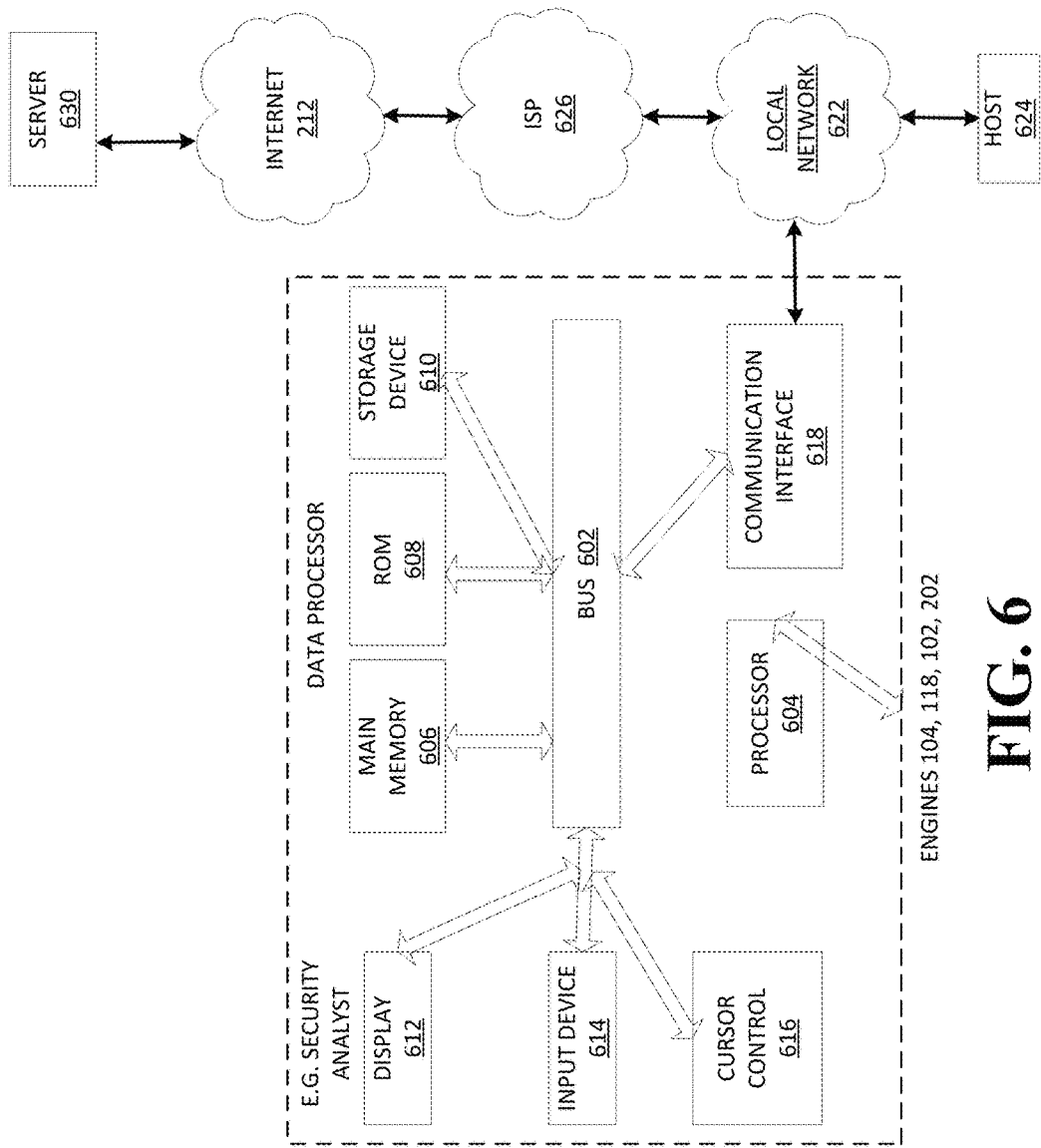
FIG. 6 illustrates an example computer system with which embodiments may be implemented.

For example, FIG. 6 is a block diagram that illustrates a computer system 600 upon which an embodiment of the system and processes described herein may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" or "memory" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 212, as shown in FIG. 2. Local network 622 and Internet 212 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 212, ISP 626, local network 622 and communication interface 618. The received code may be executed by processor 604 as it is received, and/or stored in storage device 610, or other non-volatile storage for later execution.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A computer system for monitoring a data communication network comprising:
at least one processor configured for:
receiving security event data from a sensor, the sensor operatively coupled to the data communication network and operative for determining the existence of a client/server connection on the data communication network;
transmitting a notification to a particular user of a machine on the data communication network associated with the client of the client/server connection, the notification comprising the indication of the nature of a security event represented in the security event data and a query as to the nature of the particular user's network activity relating to a server of the client/server connection, wherein the security event comprises a determination that the server involved in the client/server connection possesses a security indication characteristic, and wherein the security indication characteristic includes data indicating: (a) that the server presents a known security risk to the network, (b) that the server has not been seen in previous communications on the network, (c) that characteristics of the communication between the client and the server exhibits characteristics indicative of possible security risk;
receiving the particular user's response to the query;
based upon the particular user's response to the query, generating a security alert based on the response to the query and the security event data;
communicating the security alert to a security analyst computer system associated with the data communication network; and
employing user responses in connection with pre-stored data obtained by logging of information derived from one or more prior communications with a particular server, to enable the security analyst computer system to analyze historical traffic data with the particular server and use that historical traffic data to assess a security risk for the particular server.

2. The system of claim 1, wherein the client/server connection is characterized by a monitored exchange of packets between the client and the server.

3. The system of claim 1, wherein the client/server connection is characterized by NetFlow data.

4. The system of claim 1, wherein the security event comprises a determination that the server involved in the client/server connection possesses a security indication characteristic.

5. The system of claim 4, wherein the security indication characteristic includes data indicating: (a) that the server presents a known security risk to the network, (b) that the server has not been seen in previous communications on the network, (c) that characteristics of the communication between the client and the server exhibits characteristics indicative of possible security risk.

6. The system of claim 1, wherein the security event data comprises at least a user identifier and an indication relating to the security event.

7. The system of claim 6, wherein the at least one processor is further configured for using the user identifier to determine a manner of communication to the particular user of the machine that generated the security event data.

8. The system of claim of claim 6, wherein the at least one processor is further configured for matching the user identifier with a computer system constituting the client of the client/server connection and determining the particular user on the data communication network.

9. The system of claim 1, wherein the at least one processor is further configured for assigning a priority to the security alert based on comparing the response to the query with a predetermined response database.

10. The system of claim 9, wherein the at least one processor is further configured for communicating the security alert to the security analyst computer system further comprises communicating the assigned priority of the security alert.

11. The system of claim 1, wherein the existence of the client/server connection is determined by reference to communication metadata relating to a communication between the client and the server.

12. The system of claim 1, wherein the security event data comprises data correlating the identity of the server involved in the communication with security characteristics of previously identified servers.

13. The system of claim 12, wherein the data correlating the identity of the server involved in the communication comprises "previously seen" data obtained from a separate network security system.

14. The system of claim 1, wherein the query to the particular user comprises a request to the particular user for an indication of intention to connect to the particular server in the client/server connection.

15. The system of claim 1, wherein the at least one processor is further configured for obtaining context information as to characteristics of the connection between the client and the server useful by the security analyst computer system in assessing security risk of the server.

16. The system of claim 15, wherein context information includes but is not limited to one or more of the following: whether the server is on a black list of known nefarious servers, whether the server is on white list of previously-approved servers, whether a particular application on the server is expected to execute, an expected duration of connection to the server, an expected frequency of connection to the server, whether use of a particular port in the communication protocol was expected by the particular user, whether a connection to the server at a particular time of day was expected, the role of the particular user.

17. The system of claim 1, wherein the notification to the particular user is communicated to the particular user by one or more of the following communication mechanisms: executing a browser script to generate a user interface for displaying information to the particular user and/or receiving user input; executing a stand-alone application for generating a user interface for displaying information to the particular user and/or receiving user input; providing a text message (SMS) to the user with information about the query; providing an email to the particular user with information about the query.

18. A method for monitoring a data communication network, comprising:

receiving security event data from a sensor, the sensor operatively coupled to the data communication network and operative for determining the existence of a client/server connection on the data communication network;

transmitting a notification to a particular user of a machine on the data communication network associated with the client of the client/server connection, the notification comprising the indication of the nature of a security event represented in the security event data and a query as to the nature of the particular user's network activity relating to a server of the client/server connection, wherein the security event comprises a determination that the server involved in the client/server connection possesses a security indication characteristic, and wherein the security indication characteristic includes data indicating: (a) that the server presents a known security risk to the network, (b) that the server has not been seen in previous communications on the network, (c) that characteristics of the communication between the client and the server exhibits characteristics indicative of possible security risk;

receiving the particular user's response to the query;

based upon the particular user's response to the query, generating a security alert based on the response to the query and the security event data;

communicating the security alert to a security analyst computer system associated with the data communication network; and employing user responses in connection with prestored data obtained by logging of information derived from one or more prior communications with a particular server, to enable the security analyst computer system to analyze historical traffic data with the particular server and use that historical traffic data to assess a security risk for the particular server.

19. The method of claim 18, wherein the security event data comprises at least a user identifier and an indication relating to the security event, and further comprising:

matching the user identifier with a computer system constituting the client of the client/server connection and determining the particular user on the data communication network.

20. The method of claim 18, wherein the security event data comprises data correlating the identity of the server involved in the communication with security characteristics of previously identified servers.

21. The method of claim 18, further comprising obtaining context information as to characteristics of the connection between the client and the server useful by the security analyst computer system in assessing security risk of the server.

22. The method of claim 18, wherein the notification to the particular user is communicated to the particular user by one or more of the following communication mechanisms: executing a browser script to generate a user interface for displaying information to the particular user and/or receiving user input; executing a stand-alone application for generating a user interface for displaying information to the particular user and/or receiving user input; providing a text message (SMS) to the particular user with information about the query; providing an email to the particular user with information about the query.

23. A non-transitory computer readable storage media encoded with instructions that, when executed by a processor, cause the processor to perform operations including:

receiving security event data from a sensor, the sensor operatively coupled to a data communication network and operative for determining the existence of a client/server connection on the data communication network;

transmitting a notification to a particular user of a machine on the data communication network associated with the client of the client/server connection, the notification comprising the indication of the nature of a security event represented in the security event data and a query as to the nature of the particular user's network activity relating to a server of the client/server connection, wherein the security event comprises a determination that the server involved in the client/server connection possesses a security indication characteristic, and wherein the security indication characteristic includes data indicating: (a) that the server presents a known security risk to the network, (b) that the server has not been seen in previous communications on the network, (c) that characteristics of the communication between the client and the server exhibits characteristics indicative of possible security risk;

receiving the particular user's response to the query;

based upon the particular user's response to the query, generating a security alert based on the response to the query and the security event data;

communicating the security alert to a security analyst computer system associated with the data communication network; and employing user responses in connection with pre-stored data obtained by logging of information derived from one or more prior communications with a particular server, to enable the security analyst computer system to analyze historical traffic data with the particular server and use that historical traffic data to assess a security risk for the particular server.

24. The non-transitory computer readable storage media of claim 23, wherein the security event data comprises at least a user identifier and an indication relating to the security event, and further comprising instructions that cause the processor to perform:

matching the user identifier with a computer system constituting the client of the client/server connection and determining a particular user on the data communication network.

25. The non-transitory computer readable storage media of claim 23, wherein the security event data comprises data correlating the identity of the server involved in the communication with security characteristics of previously identified servers.

26. The non-transitory computer readable storage media of claim 23, wherein the notification to the particular user is communicated to the particular user by one or more of the following communication mechanisms: executing a browser script to generate a user interface for displaying information to the particular user and/or receiving user input; executing a stand-alone application for generating a user interface for displaying information to the particular user and/or receiving user input; providing a text message (SMS) to the particular user with information about the query; providing an email to the particular user with information about the query.

27. The non-transitory computer readable storage media of claim 23, wherein context information includes but is not limited to one or more of the following: whether the server is on a black list of known nefarious servers, whether the server is on white list of previously-approved servers, whether a particular application on the server is expected to execute, an expected duration of connection to the server, an expected frequency of connection to the server, whether use of a particular port in the communication protocol was expected by the particular user, whether a connection to the server at a particular time of day was expected, the role of the particular user.

* * * * *